United States Patent
Miller

[11] 3,715,278
[45] Feb. 6, 1973

[54] SILICEOUS MATERIALS HAVING ENZYME-POLYMER PRODUCT ATTACHED TO SURFACE THEREOF

[75] Inventor: Robert E. Miller, Ballwin, Mo.

[73] Assignee: Monsanto Company, St. Louis, Mo.

[22] Filed: Feb. 11, 1970

[21] Appl. No.: 10,655

[52] U.S. Cl. ........................ 195/63, 68, DIG 11
[51] Int. Cl. .................................... C07g 7/02
[58] Field of Search ............... 195/63, 63 P, 66, 68

[56] References Cited

UNITED STATES PATENTS

| | | | |
|---|---|---|---|
| 3,519,538 | 7/1970 | Messing et al. | 195/63 |
| 3,502,545 | 3/1970 | Westman et al. | 195/66 |
| 3,574,062 | 4/1971 | Sato | 195/68 X |

OTHER REFERENCES

Levin et al., A Water-Insoluble Polyanionic Derivative of Trypsin. I. Preparation and Properties, Biochemistry. Vol. 3 No. 12 1964 (pp 1905–1912) QP501B52.

*Primary Examiner*—Alvin E. Tanenholtz
*Assistant Examiner*—David M. Naff
*Attorney*—Gordon W. Hueschen and Talivaldis Cepuritis

[57] ABSTRACT

Enzyme-polymer products are covalently bound to siliceous materials by siliation of the siliceous material to provide functional groups which react with functional groups in the polymer-enzyme molecule. Alternatively, the polymer is first reacted with the reactive groups of the organosilated siliceous material and the enzyme subsequently reacted with the product of this reaction. The product in either case is an insoluble enzymatically-active siliceous material in which the enzyme is covalently bound to the polymer molecule which is in turn covalently bound to the surface of the organosilated siliceous material.

8 Claims, No Drawing Figures

SILICEOUS MATERIALS HAVING ENZYME-POLYMER PRODUCT ATTACHED TO SURFACE THEREOF

BACKGROUND OF INVENTION

1. Field of Invention
   Enzymes-insoluble.
2. Prior Art

The various activities and utilities of enzymes are extremely well established and documented. The enzymes are protein in nature and are water-soluble, so that their employment is also attended by loss or a "using up" of the enzyme. Recently, attempts have been made to prolong the activity of enzymes and to render them insoluble, and thus suitable for recovery and reuse, by attachment of the enzymes to various organic polymers. Such efforts have met with greater or lesser degrees of success, but such approach is seriously handicapped by the high cost of organic material suggested for combination with the enzymes to produce an insoluble product. It would be highly desirable to have available insoluble long-acting and reusable forms of enzymes which did not suffer from the disadvantage of high cost. It would also be advantageous to have such enzymatically-active materials available in a particulate form which would permit ready contact of the substrate with the insolubilized enzyme. Enzymatically-active materials having the foregoing enumerated advantages are provided by the present invention.

Production of insoluble enzyme-polymer products is known. Advantages exist relative to stability (both thermal and pH) and to alterations in substrate specificity and pH profile permitting better control of the enzymatic digestion and, in some cases, new and modified digestions. These products can be filtered from the digestion medium to stop the reaction and can then be introduced into a new medium for reuse. It is desirable to achieve practical process conditions to incorporate such insoluble activity into columns where the substrate in liquid solution or suspension can be passed continuously into the column and the enzymatically-digested substrate is recovered from the column effluent. Previous enzyme products are difficult to incorporate into column technology, generally resulting in slow through-put and columns with a limited useful life due to swelling and plugging. Attempts to prepare useful columns have been made by blending such insoluble enzyme products with filter-aid materials including diatomaceous earth, cellulose, etc. However, large quantities of this inert diluent are required for even a minimal column success. Moreover, such columns commonly plug after several hours of operation.

It has now been discovered that it is possible to realize both the potential for stabilizing and modifying enzyme reactions by surrounding the enzyme with a polyelectrolyte environment and to obtain a particle size and shape consistent with packing columns so as to achieve more useful flow rates. In addition, any of several low-priced siliceous materials are suitable carriers for the catalytically active product. To achieve attachment to the carriers, the carriers are first modified by covalently binding the polymeric ionic material (polyanions, polycations, polyampholytes, etc.) to the surface by means of a coupling agent followed by attachment of the bio-active enzyme catalyst to the polymeric surface. In this manner better flow-through rates and greater thermal and autolytic stability can be achieved. Additionally, the reactions can be carried out at optimum pH conditions and taking full advantage of substrate specificity.

Accordingly, it is an object of the present invention to provide siliceous materials bearing a reusable, long-acting enzyme and a process for producing such materials. Still other objects will readily present themselves to the skilled artisan upon reference to the ensuing specification and claims.

SUMMARY OF THE INVENTION

The present invention comprises a siliceous material having attached thereto, through reactive groups provided on the surface thereof by means of an organosilane treatment, a polymer, to which, in turn, an enzyme molecule is attached by means of a reactive group in the enzyme not essential for enzymatic action. The products of the reaction are insoluble, reusable, long-acting enzymatically-active siliceous materials in which the enzyme is covalently bound. Such materials can be conveniently provided in particulate form to facilitate rapid and complete contact of the enzymatically-active material with the substrate upon which enzymatic action is desired.

DESCRIPTION OF THE PREFERRED EMBODIMENTS

The invention involves an enzyme-polymer covalently bound to a siliceous material by means of an organosilane coupling agent. The active enzyme can be a neutral protease, an alkaline protease or both, and optimally also an additional enzyme, e.g., amylase or lipase, to further increase the range of enzymatic activity of the product.

The polymer is preferably one containing a free carboxyl or carboxylic anhydride group adapted to effect covalent bonding with the enzyme or enzymes either directly or through activation of a carboxyl group thereof. The polymer may be of relatively low molecular weight and non-crosslinked or it may be of higher molecular weight and be itself water insoluble. These different types of composites have their own specific fields of application, as in the food and brewing fields. Also, they have application in the digestion of organic materials such as sewage or conversion of waste materials and low grade protein e.g., fish, to fertilizer materials. Numerous fields of application for enzymes are already established and the composites of the invention find ready application in all such fields, especially because of their stability, and both diverse and wide range of enzymatic effectiveness. When either soluble or insoluble enzyme-polymer active components are used, the composites of this invention are insoluble and are recoverable for reuse, are relatively stable, and long-acting in effect.

DEFINITIONS

"EMA" is a polymer of ethylene and maleic anhydride. Polymers of this type are preferred according to the present invention.

"EMA-type" polymer is defined hereinafter.

"EMA-enzyme" or "EMA/enzyme" is a copolymer of ethylene and maleic anhydride having enzyme covalently bonded thereto. The product is the same whether the enzyme is reacted directly with an anhydride group of the ethylene-maleic anhydride copolymer or with a carboxyl group of the ethylene-maleic anhydride copolymer, whether or not using an intermediate activating mechanism for carboxyl groups of the polymer. Anhydride groups not participating in the reaction by which the product is produced in aqueous medium are present in the product as carboxyl or carboxylate groups. Such non-participating groups may, however, be converted to amide, imide, ester, et cetera, groups, as may be present in EMA-type polymers, as hereinafter defined.

"Water-insoluble" means that the enzyme-polymer concerned does not dissolve in water or aqueous solutions.

"Water-soluble" means not water-insoluble, and is further defined hereinafter.

PROCESS

Enzyme-polymer derivatives can be prepared by reacting a crystalline or crude enzyme or enzyme mixtures with the polymer in solution, resulting in formation of a polymeric product in which the enzymes are covalently bound, and which, in turn, is subsequently attached to an organosilane-treated siliceous materal. In the alternative, the polymer is attached to the siliceous material via an organosilane coupling agent first and the enzyme then attached to the polymer.

The reaction of the polymer with a plurality of enzymes can be carried out stepwise, one enzyme at a time, with or without intermediate isolation, or with several enzymes at once. The latter procedure is preferred for reasons of time, covenience and economy when more than one enzyme or the material is desired.

When an anhydride or carboxyl is present in the polymer, e.g., an EMA-type polymer, covalent bonding of the enzyme to the polymer may be effected directly through reaction or coupling with an anhydride group or with a carboxyl group using an activating agent. The product is the same in both cases. The pH range for the reaction depends on the enzymes employed and their stability ranges. It is usually about 5 to 9.5, preferably about 6–8, but adjustment must be made for individual cases. Isolation and purification is generally effected according to normal biochemical procedures, and by the general procedure of the examples which follow. Since covalent bonding of the enzyme to the polymer is desired, the reaction is ordinarily carried out at low temperatures and at relatively neutral pH's, in water or dilute aqueous buffer as solvent.

When carried out in this manner, the results are production of the desired active enzyme-polymer derivative, but degree of activity imparted to the polymeric product is sometimes lower than desired, possibly due to partial inactivation of the enzyme during the process. Resort may frequently advantageously be had to employ of a mixed solvent system, using a solvent in which the enzyme is at least partially soluble, usually in an amount up to about 50 percent by volume. Dimethylsulfoxide (DMSO) is especially suitable as solvent together with water or aqueous buffer solution in a mixed solvent system. Using such a mixed solvent system, the desired active enzyme-polymer is ordinarily obtained in higher yields and conversions to desirably active composite, and introduction of desirably high amounts of enzyme activity into the polymer molecule is generally less difficult.

As far as the polymer in such reaction, it preferably contains carboxyl or anhydride linkages, especially where the enzyme contains an amino, hydroxyl (including phenolic hydroxyl), or sulfhydryl group not essential for its enzymatic activity. Where the enzyme contains a carboxyl group not essential for activity, the polymer can contain free hydroxyl or amine groups for reaction therewith. The polymer is preferably EMA or an EMA-type polymer, but it can be any of those types previously disclosed for coupling or reaction with an enzyme, and in any event it is adapted to effect covalent bonding with the enzyme to produce an enzyme-polymer product either directly or indirectly using an activating agent. Inasmuch as the enzymatic activity of the starting enzyme is desired to be retained in the final product, it is of course firstly necessary that bonding of the enzyme to the polymer be through a group which will not result in inactivation of an active site in the enzyme molecule. Among the various reactive groups of enzyme molecules may be mentioned, besides amino and sulfhydryl, also hydroxyl (including phenolic hydroxyl), carboxyl and imidazolyl. Such groups are present in free or unbound form in inactive portions of enzyme molecules, as in a lysine, cysteine, serine, threonine, histidine, or typrosine moiety of an enzyme molecule, where the particular moiety in question is not considered essential for enzymatic activity, either catalytic in nature or for substrate binding. Therefore, attachment to the polymer molecule is through reaction of the polymer with such groups so as to avoid inactivation of the enzymes during attachment to the polymer molecule. Generally, the linkage is an amide, imides, ester, thioester, or disulfide group, such as formed by the carboxyl or anhydride of the polymer with an amine or hydroxyl group in a nonessential moiety of the enzyme protein chain. Amides are conveniently formed by reacting pendant amino groups of the enzyme with carboxylic anhydride groups on the carrier polymer in water, in aqueous buffer media, or in mixed solvents. Amides, imides and esters are readily formed by activating carboxyl groups of the polymer, or alternatively pendant carboxyls of the enzyme, and reacting them with respective hydroxyl, amine or mercaptan groups on the other reactant. Such activation may be effected using various carbodiimides, carbodiimidazoles, Woodward's or Sheehan's reagent, or the like, to form highly active intermediates capable of reacting with other groups mentioned above under mild conditions, the latter favoring retention of enzymatic activity.

The polymer selected for such reaction can therefore be said to be adapted to couple or react with the plurality of enzymes, either directly or indirectly through use of an activating agent, as already indicated, and in any event to effect covalent bonding with the enzymes. The attachment procedures given are conducted by techniques adapted to include any requisite protection for the enzyme, which may include a reversible blocking of the enzymatically active site or sites, as for example in the case of papain, where mercuripapain or zinc papain may be employed as an intermediate for reaction with the polymer in order to effect greater yields upon attachement, the protecting atoms being removed subsequent to the attachment reaction.

ENZYMES

The enzyme starting material may be obtained from any suitable source, whether vegetable, animal or microbial. Many are available commercially. In addition to protease, e.g., acid and/or neutral and/or alkaline protease, another differently active enzyme is also preferred for maximum operative enzymatic activity. An amylase is preferred, but a lipase or cellulase may be used instead of or in addition to the amylase. A carbohydrase, lipase, esterase, nuclease, or other type of hydrolase may be an additional enzyme reactant. A hydrase, oxidoreductase, or demolase may also be employed, or a transferase or isomerase, depending upon the ultimate activity and application intended. At any rate, an alkaline, neutral, or acid protease, and preferably both a neutral protease and an alkaline protease, can be present, covalently bound in the enzyme-polymer molecule.

Many such enzymes can conveniently be obtained from microorganisms which include bacteria, yeast, fungi and the like by using well-known fermentation methods such as those generally described in KIRK-OTHMER, Encyclopedia of Chemical Technology 8, 173–204, and a great many microbially-produced enzymes are available commercially.

The exact activity of the enzyme or enzymes employed as starting material depends on the exact method of preparation and is not critical to the present invention providing only that the enzymatically active product produced therefrom has the desired enzymatic activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH; the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology 30, 291 (1947) and in Methods of Enzymology 2, 33, Academic Press N.Y. (1955). Amylase activity is generally determined by the well-known dinitrosalicylic acid method of Bernfeld. Still other test procedures are known in the art and some are set forth hereinafter.

A particularly effective source of mixed enzymes which can be used as starting material in the present invention is a mutated *Bacillus subtilis* organism. The process for producing this organism and enzymes therefrom is described in U.S. Pat. No. 3,031,380. A culture of this *Bacillus subtilis* (strain AM) organism has been deposited with the United States Department of Agriculture, Agricultural Research Service, Northern Utilization Research and Development Division, 1815 North University Street, Peoria, Illinois 61604, and has been assigned No. NRRL B-3411. The enzymatically active material produced by this organism has been found generally to consist of two proteases, approximately 65–75 percent neutral protease (activity at a pH of 7.0–7.5) and about 25–35 percent alkaline protease (activity at a pH of 9 to 10). A significant amount of amylase is also present. There are generally about 700 thousand to about 1.2 million units of neutral protease activity per gram of isolated solids and about 250 thousand to about 400 thousand units of alkaline protease activity per gram as determined by Anson's Variation of the Kunitz "Casein" method. There are generally about 300 thousand to 350 thousand units of amylase activity per gram as determined by the Bernfeld method. As pointed out in the cited patent, the relative proportions of protease to amylase will vary depending on the exact conditions of growth of the microorganism, but it has been found that the neutral and alkaline protease and the amylase will be produced, in at least some amounts, almost regardless of changes in the culture medium and other conditions of growth of the microorganism. The ratio of the activity of the alkaline protease to the activity of the neutral protease in the starting materials and in the product is preferably about 0.25–1.2 to one.

Another source of mixed enzymes which can be used as starting material in accord with the present invention is *B. subtilis* strain NRRL 644, *B. subtilis* strain NRRL 941, and *B. subtilis* strain IAM 1523 (Japanese Culture Collection). Still other *B. subtilis* microorganisms are available which produce protease, a mixture of proteases, or protease and amylase, at least to a limited if not optimum extent. The so-called *Streptomyces griseus* neutral protease has a broad pH activity range and may constitute one starting enzyme for incorporation into the products of the invention.

Other typical enzymes are trypsin, chymotrypsin, pepsin, papain, carboxypeptidase, rennin, and the like.

POLYMERS

In its broadest context, the polymer to which the plurality of enzymes are to be attached according to one or more aspects of the invention contains carboxyl or anhydride linkages, especially where the enzymes contain an amino, hydroxyl, or sulfhydryl group not essential for their enzymatic activity. Where an enzyme contains a carboxyl group not essential for activity, the polymer can contain hydroxyl or amine groups for reaction therewith. The polymer may be EMA or an EMA-type polymer, or be any of those types previously disclosed for coupling or reaction with an enzyme, and in any event it is adapted to couple or react with the enzymes to effect covalent bonding and production of the desired enzyme-polymer composite.

Since covalent bonding is desired, it is understood that the polymer is tailored to contain at least one reactive site for each polymer molecule with which the enzymes can react, either directly or indirectly, to produce a covalent bond. According to the invention, this reactive site (or sites) is preferably a carboxyl or carboxylic anhydride group.

The product of the invention thus comprises enzymes bound covalently through groups which are nonessential for enzymatic activity to a polymer (a) comprising chains of carboxylic acid or carboxylic acid anhydride units, said polymer chains being formed by polymerization of polymerizable acids or anhydrides, or (b) comprising units of carboxylic acid or carboxylic acid anhydride groups separated by carbon chains of at least one and not more than four carbon atoms, said carbon chains being part of a unit which contains a maximum of 18 carbon atoms, said chains usually being formed by copolymerizing a polymerizable acid or anhydride with another copolymerizable monomer, and preferably wherein the starting acid or anhydride and any additional copolymerizable monomer are unsaturated and such polymerization or copolymerization comprises additional type polymerization or copolymerization involving such unsaturation.

The polymeric reactant is thus preferably defined broadly as follows: a polymer (a) comprising chains of carboxylic acid or carboxylic acid anhydride units, said polymer being formed by polymerization of polymerizable acids or anhydrides, or (b) comprising units of carboxylic acid or carboxylic acid anhydride groups separated by carbon chains of at least one and not more than four carbon atoms, said carbon chains being part of a unit which contains a maximum of 18 carbon atoms, said chains usually being formed by copolymerizing a polymerizable acid or anhydride with another copolymerizable monomer, and preferably wherein the starting acid or anhydride and any additional copolymerizable monomer are unsaturated and such polymerization or copolymerization comprises addition type polymerization or copolymerization involving such unsaturation.

Among such polymers, polyelectrolytes having units of the formula

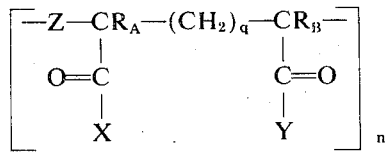

wherein: $R_A$ and $R_B$ are selected from the group consisting of hydrogen, halogen (preferably chlorine), alkyl of one to four carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene) comprising a carbon chain having one to four carbon atoms, inclusive, said carbon chain being part of a unit which contains one to 18 carbon atoms inclusive, $q$ is zero or one, $X$ and $Y$ are selected from hydroxy, $-O$ alkali metal, OR, $-OH-NH_3$, $-OH-R_3N$, $-OH-R_2NH$, $-OH-RNH_2$, $-NRR'$, $-(Q)_p-W-(NR'R')_x$, and $-(Q)_p-W-(OH)_x$, wherein $x$ is 1 to 4 and $p$ is zero or one, wherein R is selected from the group consisting of alkyl, phenylalkyl, or phenyl, in each case of one to 18 carbon atoms, wherein R' is H or R, wherein Q is oxygen or $-NR'-$, and wherein W is a bivalent radical preferably selected from lower-aklylene, phenyl, phenylalkyl, phenylalkylphenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the enzyme attachment reaction, or produced as a minor modification of the basic polymer after attachment. Such polymers containing the above-described EMA-type units are hereinafter referred to as an "EMA-type polymer."

Since enzyme molecules have an extremely high molecular weight, even if the polymeric unit exemplified as usable for attachment of the enzyme occurs only once in a polymer chain, for example, once in every several hundred units, reaction of the enzyme with this unit will result in an enzyme-polymer product having substantial enzymatic activity and one wherein the enzyme moiety constitutes a substantial portion of the molecular weight of the polymeric enzyme product. If more than one of the exemplified units is present, multiple attachments can be achieved with increased enzymatic activity of the product. As pointed out hereinafter, preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are $-NO-$ or $-N-W-(NR'R')_x$ wherein R, W and R' have the values previously assigned.

A preferred type of polymeric material useful in the practice of the invention is the polymer of an olefinically unsaturated polycarboxylic acid or derivative with itself or in approximately equimolar proportions with at least one other monomer copolymerizable therewith. The polycarboxylic acid derivative can be of the non-vicinal type, including acrylic acid, acrylic anhydride, methacrylic acid, crotonic acid or their respective derivatives, including partial salts, amides and esters or of the vicinal type, including maleic, itaconic, citraconic, $\alpha$, $\alpha$-dimethyl maleic, $\alpha$-butyl maleic, $\alpha$-phenyl maleic, fumaric, aconitic, $\alpha$-chloromaleic, $\alpha$-bromomaleic, $\alpha$-cyanomaleic acids including their partial salts, amides and esters. Anhydrides of any of the foregoing acids are advantageously employed.

Co-monomers suitable for use with the above functional monomers include $\alpha$-olefins such as ethylene, propylene, isobutylene, 1- or 2-butene, 1-hexene, 1-octene, 1-decene, 1-dodecene, 1-octadecene, and other vinyl monomers such as styrene, $\alpha$-methyl styrene, vinyl toluene, vinyl propionate, vinyl amine, vinyl chloride, vinyl formate, vinyl acetate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of co-monomers, in which case the total amount of the co-monomers will preferably be about equimolar with respect to the polybasic acid derivatives. Although these copolymers can be prepared by direct polymerization of the various monomers, frequently they are more easily prepared by an after-reaction modification of an existing copolymer.

Copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines, or ammonia, etc., either prior to, during, or subsequent to enzyme attachment. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by lower-alkylene, phenyl, phenylalkyl, phenylalkylphenyl, or alkylphenylalkyl, which are prepared in the same manner in each case with due consideration of preservation of enzyme attachment sites as previously stated. Other aryl groups may be present in place of phenyl groups. Particularly useful derivatives are those in which negatively-charged carboxyl groups are partially replaced with amine or amine salt groups. These are formed by reaction of said carboxyls with polyamines such as dimethylaminopropylamine or dialkylamino alcohols such as dimethylaminoethanol, the former forming an amide linkage with the polymer and the latter an ester linkage. Suitable selection of the above derivatives permit control of several parameters of performance for the enzyme-polymer products of the invention.

Representative dibasic acid or anhydride-olefin polymers, especially maleic acid or anhydride-olefin polymers, of the foregoing type (EMA-type) are known, for example, from U.S. Patent Nos. 2,378,629, 2,396,785, 3,157,595, and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, di-tertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of 8 to 10,000, preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The product is commercially available.

The maleic anhydride copolymers thus obtained have repeating anhydride linkages in the molecule, which are readily hydrolyzed by water to yield the acid form of the copolymer, rate of hydrolysis being proportional to temperature. In view of the fact that attachment reactions of the present invention are carried out in aqueous solutions or suspensions, or using water-solvent mixtures, the product of the said reaction or coupling of the enzyme to EMA has carboxyl or carboxylate groups attached to its chains adjacent the attached enzyme instead of anhydride groups, due to hydrolysis of the anhydride groups, which do not react with the enzymes, during the reaction. The same is true of non-reacting anhydride groups present in other polymers, such as EMA-type polymers, which hydrolyze to carboxyl or carboxylate groups during the reaction.

The term "water-insoluble," as already stated, when applied means that the product concerned does not dissolve in water or aqueous solutions. The "water-insoluble" enzyme-polymer can be separated by methods including filtration, centrifugation, or sedimentation. Such characteristics are imparted by crosslinking.

The term "water-soluble," when applied, means that the enzyme-polymer concerned dissolves in water or aqueous solutions. As usual, however, this does not mean that the product dissolves completely at all concentrations or at all pHs. On the other hand, these water-soluble products are characterized by being soluble at a variety of concentrations and pHs, and they are generally soluble at pHs of 7 or greater.

Thus, water-insoluble enzyme-polymer products, suitable for use in the invention, are produced by reacting the enzymes with a water-insoluble polymer or by causing the reaction product of the enzymes and polymer to become insoluble either by reaction with a polyfunctional crosslinking agent, such as a polyamine or polyol (including glycol), when this is necessary. The enzyme-polymer product is frequently at least in part insoluble *per se* because of interaction between the enzyme moiety and additional polymer chains. If the polymer is precrosslinked so as to have a three-dimensional structure or, in some cases, has a sufficiently long linear chain length, the starting polymer is already water-insoluble. Other methods of crosslinking exist and are well known in the art. Further detailed description follows.

Insolubilization via crosslinking can be introduced at any of three stages in the preparation of products of this invention:

1. The polymer may be crosslinked prior to attachment of the enzyme by any of several procedures well known in the art of polymer reactions (e.g., incorporation of multifunctional unsaturated monomers during preparation of the polymer or subsequent reaction of the polymer with a few mole percent of multifunctional amines, glycols, etc.).

2. Multifunctional amines, glycols, etc., can be added concurrently with the enzyme in the enzyme-attachment step.

3. A multifunctional crosslinking agent may be added to the product after the enzyme has been attached. Such crosslinking agents are added in controllable amounts sufficient to insolubilize the product.

In addition, the enzyme reactant to be attached, e.g., coupled to the polymer is commonly multi-functional in itself and thus contributes to the three-dimensional network character of the product. In fact, in many cases, the insolubilization effected in this manner alone is sufficient to impart insoluble characteristics to the enzyme-polymer product without use of additional crosslinking agents.

It is often advantageous to employ copolymers which already contain some crosslinking. Such crosslinked copolymers are known and are obtainable by conducting the polymerization, e.g., the copolymerization of maleic anhydride and hydrocarbon olefin, in the presence of a crosslinking agent, e.g., a compound containing two olefinic double bonds, such as divinylbenzene or vinylcrotonate, poly-1,2-butadiene or alpha, omega-diolefins. The quantity of crosslinking agent will vary with the degree of insolubility desired, but generally will be on the order of from 0.1 to 10 percent by weight of the total monomer mixture.

As one example of procedure for preparation of the three-dimension polymer network, where necessary or desirable, a difunctional compound can be used for crosslinking a preformed dibasic acid/$C_2$–$C_{18}$ monoolefin copolymer. This can be achieved by reaction between the copolymer and a polyamine, e.g., from 0.1 to 10 mole percent of ethylenediamine. Thus, the quantity of crosslinking of the overall polymer can be controlled. It is understood that ethylenediamine is a typical example of a cross-linking reagent, but many other compounds, such as the group of alkylene and other similar polyamines, can be used for this purpose. Soluble enzyme-polymer products, on the other hand, can advantageously be produced by somewhat different operating procedure.

To prepare soluble enzyme-polymer derivatives, therefore, the reaction is preferably performed under substantially non-crosslinking conditions. The undesired crosslinking can be reduced by performing the attachment reaction in high dilution such that fewer reactions occur between several polymer molecules and a single enzyme molecule. Alternatively, high ratios of enzyme to polymer favor reaction of several enzyme molecules with a single polymer molecule. This, therefore, results in an agglomerated enzyme/polymer system which maintains the desired soluble properties of the individual enzyme molecules. While such procedures as described above are often desirable, it is not always necessary to use dilute solutions or high enzyme/polymer ratios to cause formation of soluble enzyme-polymer derivatives. The normally soluble enzyme-polymer derivatives are of course, rendered insoluble by coupling to the siliceous material.

ORGANOSILANE COUPLING AGENTS

Suitable agents for coupling the enzyme-polymer to the siliceous material such as glass beads or fibers, diatomaceous earth, sand, clays, asbestos, and the like, are substituted organosilanes which can be represented by the formula

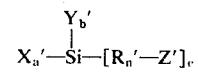

where $X'$ is a hydrolyzable group capable of reacting with a hydroxyl group, $Y'$ is hydrogen or monovalent hydrocarbon group, R is alkylene group having from one to about 20 carbon atoms, $Z'$ is a functional group capable of reacting with the aforementioned polymer, $n$ is an integer having a value of 0 to 1, $a$ is an integer having a value of 1 to 3, inclusive, $b$ is an integer having a value of 0 to 2, inclusive, $c$ is an integer having a value of 1 to 3, inclusive, and the sum of $a + b + c$ equals 4.

Examples of suitable $X'$ groups include halo, hydroxy, alkoxy, cycloalkoxy, aryloxy, alkoxy-substituted alkoxy such as $\beta$-methoxyethoxy or the like, alkoxycarbonyl, aryloxycarbonyl, alkyl carboxylate, and aryl carboxylate groups, preferably having eight or less carbon atoms.

Examples of suitable $Y'$ groups in the above formula are hydrogen, methyl, ethyl, vinyl, isobutyl, and other hydrocarbyl groups, preferably having ten or less carbon atoms.

The $R'$ group in the above formula can be any alkylene group having up to about 20 carbon atoms, and preferably from about two to about 18 carbon atoms. Examples of such groups are ethylene, the propylenes, the butylenes, the decylenes, the undecylenes, the octadecylenes, and the like.

The $Z'$ group can be any functional group capable of reacting with the aforesaid polymer. Examples of such groups are amino, primary and secondary amido, epoxy, isocyanato, hydroxy, alkoxycarbonyl, aryloxy carbonyl, vinyl, allyl, and halo such as chloro and bromo groups, and the like.

Particularly preferred organosilane coupling agents for the purposes of this invention are the *omega*-aminoalkyl- and aminoaryltrialkoxysilanes such as *gamma*-aminopropyltrimethoxysilane, aminophenyltriethoxysilane, and the like.

SILICEOUS MATERIALS

The siliceous materials that can be utilized for the instant invention include silica in the form of sand, fibers, cloth, or the like; glass in the form of cloth, fibers, matting, or the like, diatomaceous earth, asbestos, also silicates such as wollastonite, fosterite, feldspar, mullite, various clays including bentonite, kaolin, etc. The principal requirement of the siliceous material is that surface hydroxyl groups be present which are reactive with the hydrolyzable groups on the organosilane coupling agent.

The siliceous material can be treated with the organosilane coupling agent in any convenient manner by contacting the former with the latter to obtain the desired bonding. Usually the organosilane is dissolved in an inert solvent such as toluene, xylene, or the like, and the resulting solution is then applied to the siliceous material. Aqueous solutions of the silane can also be used.

The amount of coupling agent employed is dependent upon the nature and surface area of the siliceous material, and also, of course, on the particular polymer to be ultimately attached to the material. Usually at least about 0.01 percent by weight of the coupling agent, based on the weight of the siliceous material, is desired. Amounts in the range from about 0.25 to about 2.0 percent by weight are preferred.

BONDING OF THE ENZYME-POLYMER TO THE SILICEOUS MATERIAL

The enzyme-polymer products of this invention can be prepared by providing the suitably organosilane-treated siliceous material having reactive groups on the surface thereof and reacting this material with the aforementioned polymer so as to substantially coat the treated siliceous material therewith. Thereafter a desired enzyme is attached to the polymer coating by reacting reactive groups of the enzyme which are not essential for enzymatic activity with reactive groups of the polymer.

In an alternative embodiment of this invention an enzyme-polymer prepared as hereinbefore set forth is contacted with an organosilane-treated siliceous material so as to react the organosilane reactive groups with the polymer, thereby covalently bonding the polymer to the surface of the treated siliceous material.

As set forth above, enzymes suitable for coupling according to this invention include vegetable enzymes (e.g., papain, ficin, bromelain, etc.), animal enzymes (e.g., trypsin, chymotrypsin, pancreatic pepsin, pancreatic lipase, etc.), and microbial enzymes (e.g., bacterial or fungal proteases, amylases, lipases, cellulases, etc.). Conditions for the attachment of particular enzymes to specific polymer-coated, treated siliceous materials varies considerably, depending upon the nature of the enzyme and the character of the polymeric coating employed.

The composites of this invention and a process for preparing these composites are further illustrated by the following examples in which a commercially available *B. subtilis* enzyme mixture containing neutral protease ($1.27 \times 10^6$ units/gram), alkaline protease ($0.30 \times 10^6$ units/gram), and amylase ($0.31 \times 10^6$ units/gram) was utilized in preparing insoluble enzymatically-active composites.

EXAMPLE 1: ENZYME BONDING ON CALCIUM SILICATE

Calcium silicate (5.0 grams), coupled with 0.25 weight percent *gamma*-aminopropyltrimethoxysilane and *B. subtilis* enzyme mixture (1.0 gram) are slurried in 20 milliliters of a dimethylsulfoxide (DMSO) solution of EMA (DMSO to EMA w/w ratio 5:1). The obtained slurry is stirred until gelation which takes place after about 8 minutes.

Thereafter the produced gel is blended, in a laboratory blender, with crushed ice, water (150 milliliters), and n-propanol (75 milliliters) for 45 seconds, water (300 milliliters) added thereto, and the resulting mixture stirred for 72 hours at 4° C. The mixture is then centrifuged, and the recovered solids lyophilized. About 4.3 grams of a solid product having a protease activity of about 1000 units per gram is obtained.

EXAMPLE 2: ENZYME BONDING ON SILICA

In a manner similar to Example 1 but using particulate silica, as the siliceous material, treating the material with *gamma*-aminopropyltrimethoxysilane, and contacting the treated material with a *B. subtilis* enzyme mixture in a dimethylsulfoxide solution of EMA an insoluble, enzymatically-active composite is obtained.

EXAMPLE 3: ENZYME BONDING ON WOLLASTONITE

In a manner similar to Example 1 but using *gamma*-aminopropyltrimethoxysilane and treating wollastonite therewith, and thereafter contacted the treated wollastonite with a *B. subtilis* enzyme mixture in a dimethylsulfoxide solution of EMA an insoluble, enzymatically active composite is obtained.

The foregoing discussion and the examples are intended as illustrative but not limiting. Still other variations within the spirit and scope of the present invention will readily present themselves to one skilled in the art.

I claim:

1. An insoluble, enzymatically-active composite comprising a siliceous material, an *omega*-aminoalkyltrialkoxysilane held on the surface thereof, an ethylene/maleic anhydride copolymer covalently bound to said *omega*-aminoalkyltrialkoxysilane, and a protease covalently bound to said ethylene/maleic anhydride copolymer.

2. The composite in accordance with claim 1 wherein the organosilane is *gamma*-aminopropyltrimethoxysilane.

3. The composite in accordance with claim 1 wherein the enzyme is a mixture of neutral protease, alkaline protease, and amylase.

4. The composite in accordance with claim 1 wherein the siliceous material is calcium silicate.

5. Process for the production of an insoluble, enzymatically-active composite comprising the steps of reacting a siliceous material with an *omega*-aminoalkyltrialkoxysilane, reacting the *omega*-aminoalkyltrialkoxy- silane with an ethylene/maleic anhydride copolymer, and attaching a protease having a reactive group not essential for enzymatic activity by reacting said reactive group with said ethylene/maleic anhydride copolymer.

6. The process of claim 5 wherein the siliceous material is calcium silicate.

7. The process of claim 5 wherein the organosilane is *gamma*-aminopropyltrimethoxysilane.

8. The process of claim 5 wherein the enzyme is a mixture of neutral protease, alkaline protease, and amylase.

* * * * *

UNITED STATES PATENT OFFICE
CERTIFICATE OF CORRECTION

Patent No. 3,715,278  Dated February 6, 1973

Inventor(s) Robert E. Miller

It is certified that error appears in the above-identified patent and that said Letters Patent are hereby corrected as shown below:

PATENT READS:                    APPLICATION READS:

Upon Allowance, Title was changed to:

"ENZYME-POLYMER PRODUCT ATTACHED TO SURFACE OF SILICEOUS MATERIALS THEREOF"

Col. 12, lines 11,12,13,14         Page 19, lines 2,3

"$X_a' - S_i - [R_n' - Z]_c$"
with $Y_b'$ above

---$X_a' - Si - [R_n' - Z']_c$---
with $Y_b'$ above

Col. 12, line 17                   Page 19, line 5
"R is alkylene"                    ---R' is alkylene---

Signed and sealed this 19th day of March 1974.

(SEAL)
Attest:

EDWARD M. FLETCHER, JR.            C. MARSHALL DANN
Attesting Officer                  Commissioner of Patents